(12) United States Patent
Robertsson (10) Patent No.: US 7,660,191 B2
(45) Date of Patent: Feb. 9, 2010

(54) METHODS AND APPARATUS FOR ACQUISITION OF MARINE SEISMIC DATA

(75) Inventor: Johan Olof Anders Robertsson, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 0 days.

(21) Appl. No.: 11/179,922

(22) Filed: Jul. 12, 2005

(65) Prior Publication Data

US 2007/0025182 A1 Feb. 1, 2007

(51) Int. Cl.
*G01V 1/38* (2006.01)
(52) U.S. Cl. .......................................... 367/16; 367/19
(58) Field of Classification Search .................... 367/15, 367/16, 19, 20; 114/242, 244, 245–246, 114/253
See application file for complete search history.

(56) References Cited

U.S. PATENT DOCUMENTS

| 4,068,208 | A | * | 1/1978 | Rice et al. ...................... 367/19 |
| 4,669,067 | A | * | 5/1987 | Roberts ......................... 367/19 |
| 5,212,668 | A | * | 5/1993 | Svendsen ...................... 367/21 |
| 6,285,956 | B1 | * | 9/2001 | Bennett et al. ................. 702/14 |
| 6,590,831 | B1 | | 7/2003 | Bennett et al. |
| 6,618,321 | B2 | | 9/2003 | Brunet |
| 6,671,223 | B2 | | 12/2003 | Bittleston |
| 6,691,038 | B2 | | 2/2004 | Zajac |
| 6,775,618 | B1 | * | 8/2004 | Robertsson et al. ........... 702/14 |
| 6,932,017 | B1 | | 8/2005 | Hillesund et al. |
| 7,161,871 | B2 | * | 1/2007 | Brunet ......................... 367/89 |
| 2003/0208320 | A1 | * | 11/2003 | Zajac ........................... 702/14 |
| 2005/0195686 | A1 | * | 9/2005 | Vaage et al. .................. 367/21 |
| 2006/0256653 | A1 | * | 11/2006 | Toennessen et al. ........... 367/16 |

FOREIGN PATENT DOCUMENTS

| GB | 0411305 | | 6/2004 |
| WO | WO0020895 | * | 4/2000 |
| WO | WO0037968 | * | 6/2000 |
| WO | WO 0161380 A2 | | 8/2001 |
| WO | WO 2005/096018 | | 10/2005 |

* cited by examiner

*Primary Examiner*—Scott A Hughes
(74) *Attorney, Agent, or Firm*—Ari Pramudji; Richard V. Wells; Jeffrey E. Griffin (57) ABSTRACT

Methods and apparatus for acquiring marine seismic data are described. One method comprises selecting tow depth of one or more marine seismic streamers based at least in part on lack of or presence of currents at different depths, and allowing the current to contribute to steering the streamers to desired lateral positions at the selected tow depth. It is emphasized that this abstract is provided to comply with the rules requiring an abstract, which will allow a searcher or other reader to quickly ascertain the subject matter of the technical disclosure. It is submitted with the understanding that it will not be used to interpret or limit the scope or meaning of the claims.

15 Claims, 4 Drawing Sheets

METHODS AND APPARATUS FOR ACQUISITION OF MARINE SEISMIC DATA

BACKGROUND OF THE INVENTION

1. Field of Invention

The present invention relates to the field of marine seismic surveying methods and apparatus. More specifically, the invention relates to methods and apparatus for improved steering of seismic streamers.

2. Related Art

Marine seismic exploration investigates and maps the structure and character of subsurface geological formations underlying a body of water. For large survey areas, seismic vessels tow one or more seismic sources and multiple seismic streamer cables through the water. The seismic sources typically comprise compressed air guns for generating acoustic pulses in the water. The energy from these pulses propagates downwardly into the geological formations and is reflected upwardly from the interfaces between subsurface geological formations. The reflected energy is sensed with hydrophones and perhaps other sensors attached to or integral with the seismic streamers, and data representing such energy is recorded and processed to provide information about the underlying geological features. The streamers may be positioned using steerable birds, deflectors, steerable buoys, and the like.

Previous attempts have not provided optimal acquisition of marine seismic data. While some techniques are improvements in the art, further improvement is desired.

SUMMARY OF THE INVENTION

In accordance with the present invention, methods and apparatus are described for controlling position of at least portions of seismic streamers, which may or may not be in over/under configuration, referring to a cross-section of the streamer geometry in a vertical plane. The methods and apparatus of the invention reduce or overcome problems with previous methods and apparatus in acquiring marine seismic data using seismic streamers. More specifically, the invention relates to methods and apparatus for improved steering of seismic streamers, reduction of noise due to currents, swell, etc., and enabling better acoustic network for positioning. Methods and apparatus of the invention may be used to increase the ability of deployed spread control elements (for example steerable birds, streamer deflectors, and source deflectors) to perform their tasks of positioning streamers during a marine seismic survey. In inventive methods and apparatus, the possibility for selecting tow depth based on lack of or presence of currents to steer or position a multi-component streamer (or an over/under streamer configuration, or other streamer configuration) to desired lateral positions, or to minimize current-induced noise, is exploited. This has not been possible before with conventional streamers since tow depth has largely been determined by the presence of receiver-side ghosts reducing low- and high-frequency content.

The inventive methods and apparatus may rely on two aspects of the data recorded along a multicomponent streamer, an over/under streamer configuration, or other configuration. Both aspects are direct consequences of seismic data deghosting: the depth at which the streamers are towed does not introduce notches within the frequency-band of interest, and deghosted data acquired with receiver locations at different depths can easily be redatumed to a common depth level. The methods and apparatus of the current invention lend themselves to implementation which may be enabled through automatic advanced spread control, particularly in marine environments that may exhibit very complex lateral, temporal and/or in-depth varying current regimes.

One aspect of the invention are methods of acquiring marine seismic data using streamers, or pairs of seismic streamers in over/under configuration, one method comprising detecting a current regime, and controlling a depth of a streamer based upon the detected current regime. The methods may comprise selecting tow depth of one or more marine seismic streamers, which may be multicomponent streamers, over/under configuration streamers, or some other configuration of streamers, based at least in part on lack of or presence of currents at different depths. Alternatively, or in addition thereto, methods of the invention may comprise allowing the current to contribute to steering the streamers to desired lateral positions at the selected tow depth during seismic data acquisition.

Another method of the invention comprises:
(a) towing a multicomponent marine seismic streamer (or an over/under configuration, or other configuration) in a vertical plane such that the depth varies along the streamer; and
(b) positioning selected portions of the streamer in different shear current regimes, thereby balancing the net force on the streamer to control lateral motion of the streamer during seismic data acquisition.

Yet another method of the invention recognizes that measurements from a multicomponent streamer will be prone to noise and may have to be towed in as "quiet" environment as possible. Fortunately, using techniques for interpolating and extrapolating data from a multicomponent streamer, the positioning requirements may be relaxed compared to conventional streamer technology to achieve the same quality in the final product. Nevertheless, in a scenario with a strong current that requires steering against with a spread control element such as known under the trade designation Q-FIN (available from WesternGeco, Houston, Tex.) and other steerable birds, the current-induced noise may reach a prohibitively high level. Another method of the invention therefore comprises:
(a) allowing a marine seismic streamer (which may be multicomponent streamers, over/under configuration, or other streamer configuration) to be carried with a current at a first depth in a first lateral direction; and
(b) raising or lowering the streamer to a second depth at which there is sufficient current in a second lateral direction substantially opposite to the first lateral direction to allow the current to force the streamer back toward a desired position during seismic data acquisition.

In this fashion, current-induced noise may be minimized or avoided, while the streamers are moved back- and forth within an acceptable range on either side of a predetermined lateral position.

Methods of the invention may include varying the depth of each receiver in a streamer, or a group of receivers, as a function of time, space, and currents, receiving a first set of seismic data signals at first time and space coordinates for the receiver or receiver group, deghosting the first set of seismic data signals to produce a deghosted data set, and redatuming the deghosted data set of seismic data signals to a common depth level. The redatuming is fairly straightforward after deghosting (separating up- and down-going waves) and may advantageously be carried out using one or more mathematical algorithms functioning as signal filters, such as compact space-time redatuming operators, such that the depth can be considered to be constant over the redatuming filter aperture.

Methods of the invention may allow minimization or elimination of current-induced noise. This result was not possible with conventional seismic streamer technologies since tow depth was largely determined by where the operators wanted the ghost signals to be.

A second aspect of the invention is an apparatus comprising:

(a) a marine seismic streamer having a plurality of sensors, the streamer adapted to be moved to different depths based at least on current at the different depths, while adapted to move with the current laterally;

(b) a calculation unit adapted deghost seismic signals received at the receivers at the different depths and redatum the deghosted signals to a common depth.

Apparatus of the invention may include a current meter adapted to detect current at one or more different depths and signal a spread control element attached to or inline with the streamer to adjust its depth based on lack of or presence of current at the different depths. Current meters useful in the apparatus and methods of the invention are those able to measure currents along the streamer, and meters able to measure current ahead of the vessel towing the streamer or streamers. Current meters may be integral with the streamer or remote from the streamer, for example in the case of a current meter attached to a vessel. The current meter may be an acoustic Doppler current meter, or any other type of current meter.

It will be understood that certain apparatus embodiments may have two or more streamers in over/under configuration, as that term is defined herein. It will also be understood that certain embodiments may have streamers that are not in over/under configuration, in other words, two or more streamers may be over/under configuration, and one or more streamers may be positioned laterally away from the over/under streamers in the cross-line (y) direction, or (z) direction. Furthermore, each streamer may have more than one spread control element associated therewith. For simplicity only, embodiments in which multiple steamers are towed in parallel and more or less in the same horizontal plane (aside from adjustments in depth due to presence or lack of sensed currents), and embodiments wherein one pair or multiple pairs of streamers are towed in over/under configuration (as defined herein), each having at least one spread control element, are discussed most herein, but the invention is not so limited.

Spread control elements useful in the invention may be remotely controlled, such as remotely controllable steerable birds. Spread control elements may control vertical (depth) and horizontal (lateral) position of their respective streamers, or a particular spread control element may be comprised of a combination of two or more spread control elements, one in the combination controlling vertical position (depth), and a second in the combination controlling horizontal (lateral) position. Systems of the invention include versions wherein a first plurality of spread control elements are operatively connected to a first streamer, and a second plurality of spread control elements are operatively connected to a second streamer. Spread control elements may be substantially equally spaced, or randomly along the length of the streamer, as may be current meters. Portions of the streamers may be offset horizontally from over/under configuration, either curved or in straight line position. Alternatively, the entire lengths of first and second streamers may be positioned in over/under arrangement.

As with the methods of the invention, apparatus of the invention are not limited in the number of streamers whose positions (depth and/or lateral position) are controlled or allowed to move with the current, nor is there any limit to the number of spread control elements and current meters, if present, on any streamer. Further, one or more streamers may be controlled to be laterally spaced in the cross-line direction away from streamers being positioned in over/under configuration, such as when positioning streamers are used. Apparatus of the invention may comprise wherein each current meter is dedicated to signal a single spread control element, or may signal two or more spread control elements. Communicating with the spread control elements may be performed by telemetry selected from hard wire, wireless, and optical telemetry.

Other apparatus of the invention comprise a controller associated with one or more spread control elements and adapted to adjust one or more of the spread control elements to move a seismic streamer or streamers to desired positions, which may be any direction in 3-dimensions, for example lateral (horizontal), vertical, or any direction in between these extremes, based on the sensed current. The desired position may be relative to another streamer, another pair of streamers, or to a natural reference such as the water surface, water bottom, or a geologic feature, or a man-made reference, such as a buoy, vessel, drilling rig, production rig, or the like. The inventive apparatus may also be useful in deploying ocean bottom cables.

Methods and apparatus of the invention will become more apparent upon review of the brief description of the drawings, the detailed description of the invention, and the claims which follow.

BRIEF DESCRIPTION OF THE DRAWINGS

The manner in which the objectives of the invention and other desirable characteristics can be obtained is explained in the following description and attached drawings in which.

It is to be noted, however, that the appended drawings are not to scale and illustrate only typical embodiments of this invention, and are therefore not to be considered limiting of its scope, for the invention may admit to other equally effective embodiments.

DETAILED DESCRIPTION

In the following description, numerous details are set forth to provide an understanding of the present invention. However, it will be understood by those skilled in the art that the methods and apparatus of the present invention may be practiced without these details and that numerous variations or modifications from the described embodiments may be possible. For example, in the discussion herein, aspects of the inventive methods and apparatus are developed within the general context of controlled positioning of seismic streamers, which may employ computer-executable instructions, such as program modules, being executed by one or more conventional computers. Generally, program modules include routines, programs, objects, components, data structures, etc. that perform particular tasks or implement particular abstract data types. Moreover, those skilled in the art will appreciate that the inventive methods and apparatus may be practiced in whole or in part with other computer system configurations, including hand-held devices, personal digital assistants, multiprocessor systems, microprocessor-based or programmable electronics, network PCs, minicomputers, mainframe computers, and the like. In a distributed computer environment, program modules may be located in both local and remote memory storage devices. It is noted, however, that modification to the methods and apparatus described herein may well be made without deviating from the scope of the present invention. Moreover, although developed within the context of controlling position of marine seismic streamers, those skilled in the art will appreciate, from the discussion to follow, that the inventive principles herein may well be applied to other aspects of seismic data acquisition. Thus, the methods and apparatus described below are but illustrative implementations of a broader inventive concept.

All phrases, derivations, collocations and multiword expressions used herein, in particular in the claims that follow, are expressly not limited to nouns and verbs. It is apparent that meanings are not just expressed by nouns and verbs or single words. Languages use a variety of ways to express content. The existence of inventive concepts and the ways in which these are expressed varies in language-cultures. For example, many lexicalized compounds in Germanic languages are often expressed as adjective-noun combinations, noun-preposition-noun combinations or derivations in Romanic languages. The possibility to include phrases, derivations and collocations in the claims is essential for high-quality patents, making it possible to reduce expressions to their conceptual content, and all possible conceptual combinations of words that are compatible with such content (either within a language or across languages) are intended to be included in the used phrases.

The present invention relates to various methods and apparatus for controlling depth and lateral position of one or more marine seismic streamers and/or spread control elements attached to or inline of the streamers, resulting in reduced noise as well as alternatively to find depths where better acoustic networks may be used for positioning. Methods and apparatus of the invention may be used in any form of marine seismology, including, but not limited to, 2-D, 3-D, and 4-D seismology. One aspect of the present invention relates to systems for acquisition of marine seismic data using streamers, a combination of two or more streamers, connected or not connected, with position controlled using either the natural current, one or more spread control element on each streamer, or combination of natural current and spread control elements. Other aspects of the present invention, which are further explained herein, relate to methods of deghosting seismic signals and using the deghosted seismic signals to redatum, or recalculate, a common depth for received seismic signals.

As used herein the phrases "over/under configuration" and "over/under configured" means, when viewing a cross-section of the streamer geometry in a vertical plane, a streamer is directly above and/or below one or more other streamer or unlimited number of streamers. The over/under configuration may be for only selected cross-sections in selected vertical planes, or for all vertical planes along the length of any particular streamer.

The term "multicomponent streamer" means a streamer cable including a plurality of receivers enabling detection of pressure and particle motion (e.g., particle displacement, particle velocity, particle acceleration or time derivatives thereof). In so-called dual sensor towed streamers, the streamers carry a combination of pressure and particle velocity sensors. The pressure sensor may be a hydrophone, while the particle or motion sensor may be an accelerometer or geophone. Multicomponent streamers may include more than two types of sensors.

The phrase "spread control element" means a device capable of movements that may result in any one or multiple straight line or curved path movements of a streamer in 3-dimensions, such as lateral (horizontal), vertical up, vertical down, and combinations thereof. The terms and phrases "steerable bird", "cable controller", "streamer control device", and like terms and phrases are used interchangeably herein and refer to spread control elements having one or more control surfaces attached thereto or a part thereof. A "steerable front-end deflector" (or simply "deflector") such as typically positioned at the front end of the outer-most streamer, and other deflecting members, such as those that may be employed at the front end of seismic sources or source arrays, may function as spread control elements in some embodiments, although they are primarily used to pull streamers and steer sources laterally with respect to direction of movement of a tow vessel.

The phrases "positioning", "control lateral motion", and the term "steering" are generally used interchangeably herein, although it will be recognized by those of ordinary skill in the art that "steering" usually refers to following a defined path, while "positioning", "control lateral position", and "remotely controlling position" could mean steering, but also include maintaining a relative position, for example, one streamer relative to a second or a third streamer, or any number of streamers relative to one or more reference points, such as natural or man-made objects, or merely deflecting an object, or steering a group of streamers towards an aim point defined by themselves, e.g., all streamers steered toward their common mean position. These phrases also include controlling position so that the streamers form a "V" or "W", or some other pattern, referring to a cross-section of the streamer geometry in a vertical plane. As "positioning" is somewhat broader than "steering", these terms are used herein, except when specific instances demand using more specific words.

The term "position", when used as a noun, is broader than "depth" or lateral movement alone, and is intended to be synonymous with "spatial relation." Thus "vertical position" includes depth, but also distance from the seabed or distance above or below a submerged or semi-submerged object, or an object having portions submerged. When used as a verb, "position" means cause to be in a desired place, state, or spatial relation.

The term "control", used as a transitive verb means to verify or regulate by comparing with a standard or desired value, and when used as a noun ("controller") means a mechanism that controls. Control may be open-loop, closed loop, feedback, feed-forward, cascade, adaptive, heuristic and combinations thereof.

The phrase "functioning to control vertical and horizontal position", when referring to two or more spread control elements, means functioning independently or interdependently to control vertical and horizontal position of streamers to which they are attached.

The term "adjusting" means changing one or more parameters or characteristics in real-time or near-real-time. "Real-time" means dataflow that occurs without any delay added beyond the minimum required for generation of the dataflow components. It implies that there is no major gap between the storage of information in the dataflow and the retrieval of that information. There may be a further requirement that the dataflow components are generated sufficiently rapidly to allow control decisions using them to be made sufficiently early to be effective. "Near-real-time" means dataflow that has been delayed in some way, such as to allow the calculation of results using symmetrical filters. Typically, decisions made with this type of dataflow are for the enhancement of real-time decisions. Both real-time and near-real-time data flows are used immediately after they are received by the next process in the decision line.

Accurate steering of a towed streamer to predetermined positions is of primary importance in time-lapse seismic applications. Also, in complex imaging applications it may be very important to occupy a detailed source/receiver geometry for instance in order to remove multiples. With apparatus and methods collectively known under the trade designation Q-MARINE, available from WesternGeco LLC, Houston, Tex. (WesternGeco), it is possible to achieve high-quality steering using apparatus known under the trade designation Q-FIN and positioning apparatus known under the trade designation IRMA, both also available from WesternGeco. However, in areas with strong sheer currents, even steering devices known under the trade designation Q-FIN may not be able to apply sufficient steering forces for the streamers to occupy their predetermined positions. Moreover, strong steering beyond a 3-4 degree feathering angle may increase the amount of noise on the hydrophone recordings very significantly. The methods and apparatus of the present invention outline steering methodologies applicable to a multicomponent streamers, over/under streamer configurations, or other streamer configurations, where current forces are taken advantage of to allow the streamer to occupy predetermined positions and/or to minimize current-induced noise, or noise from spread control elements.

In conventional streamer technology, the towing depth of a streamer may be limited by the introduction of receiver-side ghosts. In order to maintain as high frequencies as possible, the streamer should be towed shallow. On the other hand, in order to preserve the low frequencies, the streamer should be towed as deep as possible. In addition, near-surface water environment tends to be noisy with rough-seas and swell. As a result the towing depth required for a survey is tightly specified even before the survey starts and can rarely be compromised upon. With the introduction of over/under techniques as well as the multicomponent streamer, the constraints imposed by the free surface to preserve frequency content go away and it is possible to choose streamer depth for other reasons. To date, most discussions have been based around towing newer streamer designs deeper, at say 10-20 m depth, in order to avoid swell. In contrast, the present inventive methods and apparatus describe towing the streamer in an adaptive fashion with respect to different current regimes in order to steer to pre-determined positions.

Methods and apparatus of the present invention comprise selecting streamer depth where streamer lateral control may be optimized (lower magnitude, more predictable current layers), or where acoustic solutions solve better. This may enhance the 4D capability of the system, and strengthen the acoustic network. Complex imaging and demultiple applications also may benefit from the better positioning and steering provided by apparatus and methods of the invention. In some embodiments of the invention, optimal tow depth is selected to allow the absence of currents or presence of currents steer the streamers to desired lateral positions. In other embodiments, useful in many areas of the world where extremely strong shear currents may occur in different directions at different depths, one may "snake" a multicomponent streamer (or an over/under configuration) in a vertical plane such that the depth varies along the streamer. This enables putting different parts of the streamer in different shear current regimes in order to balance the net-force on the streamer to control lateral motion/position. Yet other embodiments recognize that measurements from a multicomponent streamer may be prone to noise and will likely have to be towed in as quiet environments as possible. Fortunately, techniques for interpolating/extrapolating data from a multicomponent streamer such that the positioning requirements can be relaxed compared to conventional streamer technology to achieve the same quality in the final product have been worked out. These interpolation/extrapolation techniques may include one or more mathematical expansion series, where pressure data is used to derive mathematically a filter which interpolates or extrapolates pressure data away from the pressure sensors. Nevertheless, in a scenario with a strong current that requires steering against with a steerable bird or other such spread control element, the current-induced noise may reach a prohibitively high level. In the presence of shear-currents in different directions, it is beneficial instead to let the streamer be carried with the current at a certain depth in one direction. Provided that there is a current in the opposite direction at another depth, the multicomponent streamer (or over/under configuration) is then raised or lowered to a new depth to let the current that is present there take it back towards the desired position. In this fashion, current-induced noise may be reduced or avoided, while the streamers are moved back- and forth within an acceptable range on either side of the predetermined lateral position.

Figure 1:
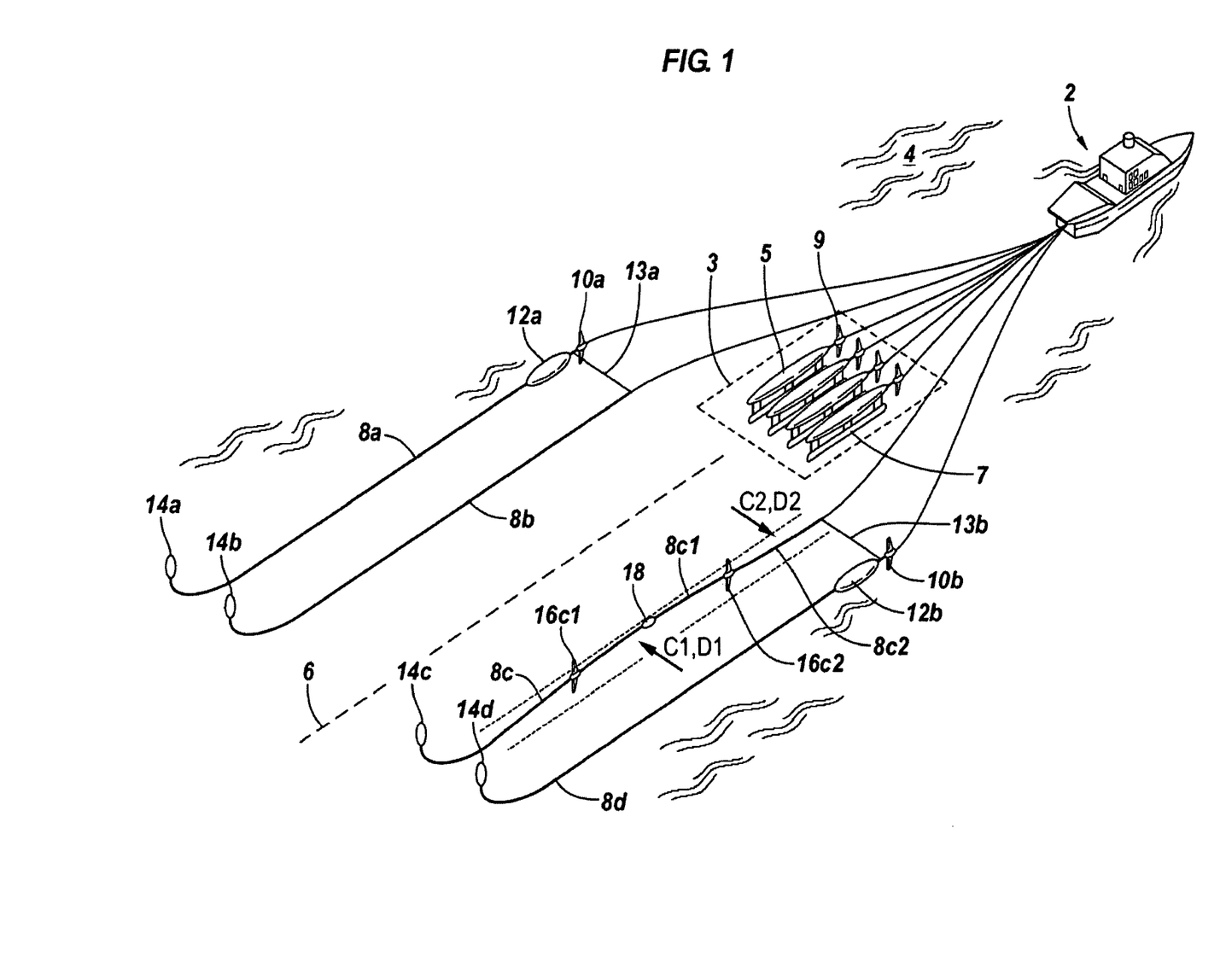
FIG. 1 is a schematic perspective view illustrating some of the principle features of certain methods and apparatus of the invention.

Referring now to the figures, FIG. 1 is a schematic perspective view, not to scale, illustrating some of the principle features of certain methods and apparatus of the invention. Illustrated is a vessel 2 in an ocean or other body of water 4 following generally a desired path 6. Vessel 2 tows, in this illustrative embodiment, a marine seismic source 3 comprised of floats 5 (four are depicted), each having one or more air-guns 7 or other acoustic signaling devices suspended downwardly therefrom. The details of source 3, floats 5, and air-guns 7 are not important to the inventive methods and apparatus, and are not further described as they are well-known in the art. Vessel 2 also tows four streamer cables 8a, 8b, 8c, and 8d, each submerged beneath the surface at a certain depth. Each streamer may include a variety of seismic sensors, as well as steering devices attached thereto, or positioned in-line therein. Steering devices may be active or passive. For example, depicted in FIG. 1 are submerged streamer deflectors 10a and 10b on the outer most streamers, 8a and 8d, respectively. Deflectors 10a and 10b may have floatation units 12a and 12b, respectively, floating on the surface. In some designs these floats may not be necessary. Similarly, each source float may have a source deflector 9. Outer-most streamers 8a and 8d may pull their neighboring streamers 8b and 8c, respectively away from centerline using so-called separation ropes or cables 13a and 13b. Each streamer may have a terminal buoy as illustrated at 14a, 14b, 14c, and 14d.

Completing FIG. 1 are streamer control devices 16c1 and 16c2, which may be steerable birds, such as those known under the trade designation Q-FIN, although other designs may work as well. A current meter 18 is illustrated on streamer 8c. A section, 8c1, of streamer 8c has been push by a current C1, at a depth D1 to the left side of its range of acceptable path width, as indicated by the arrow labeled C1, D1. The range of acceptable path width is indicated by dual parallel dotted lines. Another section, 8c2, of streamer 8c is indicated as being forced back to the right so that streamer 8c stays within its range of acceptable path width. In operation, current meter 18 senses the current C1, at depth D1, and alerts steerable birds 16c1 and 16c2 that there is a strong left-pushing current through a controller (not illustrated); however, the controller takes no action to activate corrective action by steerable birds 16c1 and 16c2 to drive streamer 8c back to the right if streamer 8c is not near its left-most edge of its lateral range. Instead, to reduce noise in the receivers in streamer 8c and other streamers, streamer 8c is allowed to drift left. Another current meter, not shown, but positioned in streamer section 8c2, senses that the current at depth D2 should be sufficient to force streamer 8c to the right, so there is reduced need for steerable birds 16c1 and 16c2 to be activated, unless the measured current C2 at depth D2 is insufficient to keep streamer 8c in its acceptable path. This reduces noise in sensor/receivers.

Figure 2:
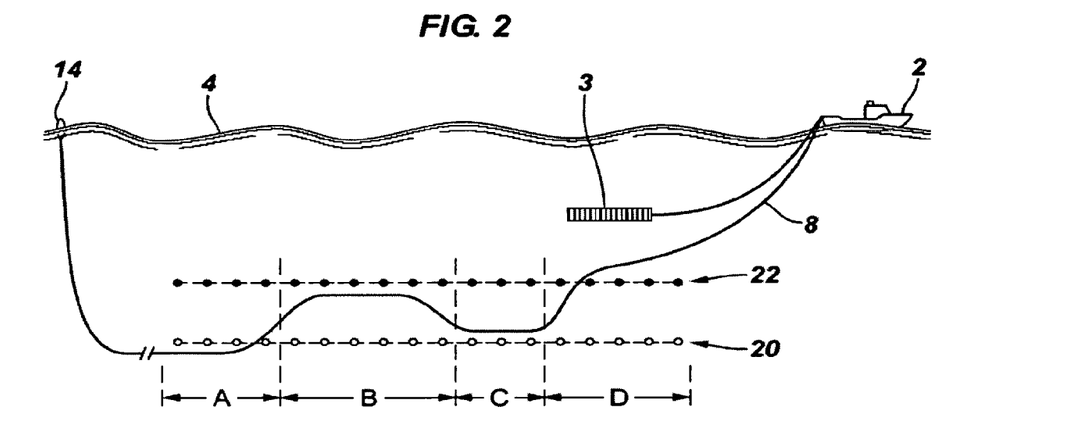
FIG. 2 is a schematic side elevation view of an embodiment of the invention.

FIG. 2 is a schematic side elevation view of another embodiment of the invention. In this embodiment, for clarity purposes only, current meters and steerable birds are not depicted in streamer 8. In FIG. 2, the line of circles 20 represents current at that depth that is substantially opposite in direction to the current at a depth represented by a line of solid dots 22. Assuming the magnitudes of the currents is substantially equal but opposite in cross-line direction at the different depths, it is possible to maneuver streamer 8 so that portions A and C are at one depth, and other portions B and D are at the other depth. In this way, cross-line forces on the streamer may be balanced, as well as affording the opportunity to retrieve seismic data in a less noisy environment. Once the depth of the different sections is realized, steerable birds and other spread control elements may not be required, or their need reduced significantly. It will be recognized that the current at one depth may not be exactly balanced in magnitude, or even in opposite direction, but the point is to substantially balance the forces on the streamers so that they may acquire data in less noisy conditions.

Figure 3A:
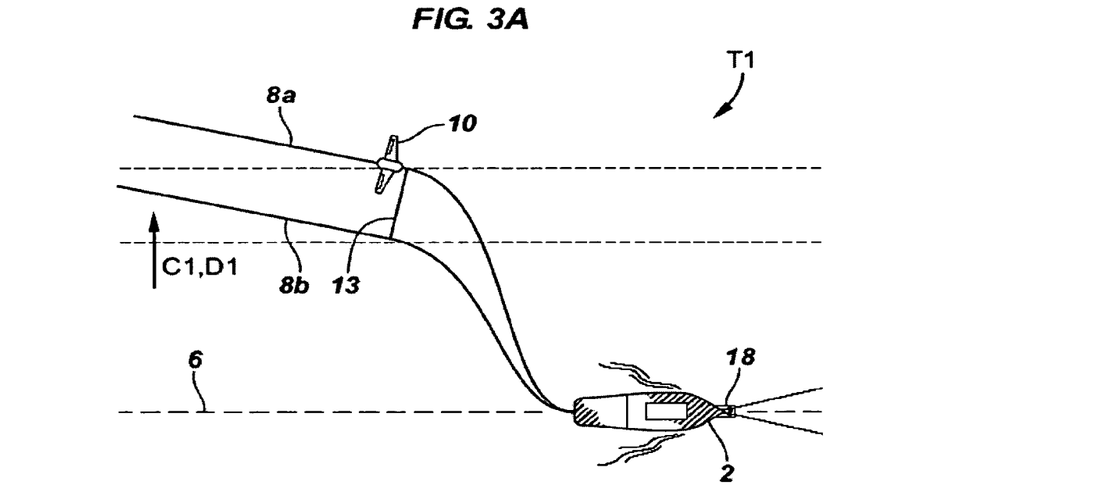
FIGS. 3A-3C illustrate schematically a time-lapse plan view illustrating features of certain inventive methods and apparatus.
Figure 3B:
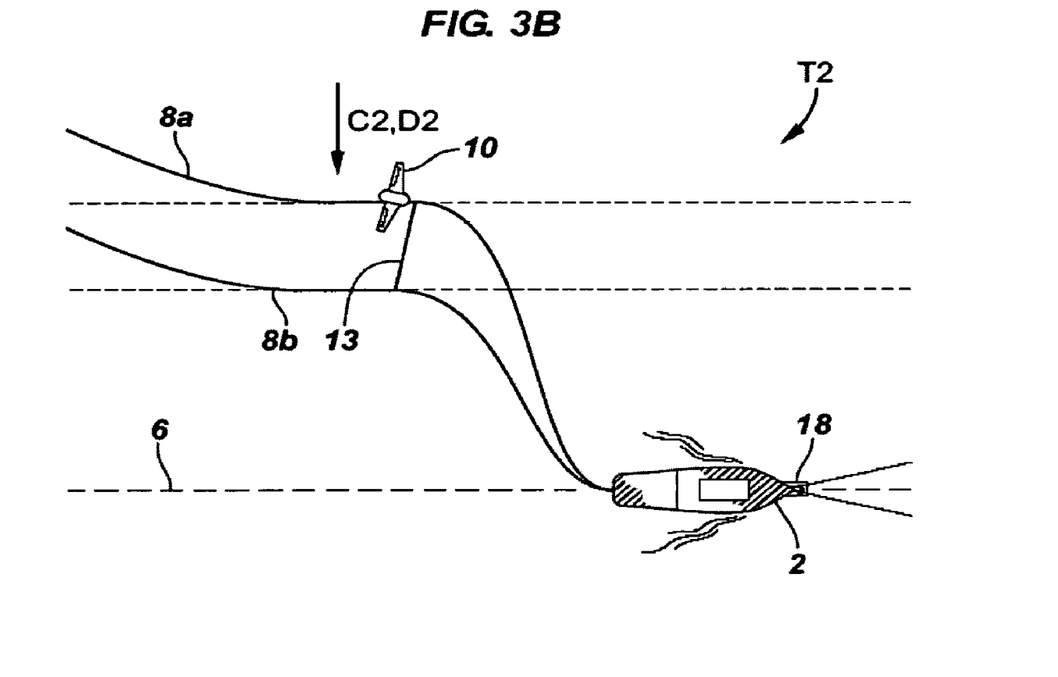
Figure 3C:
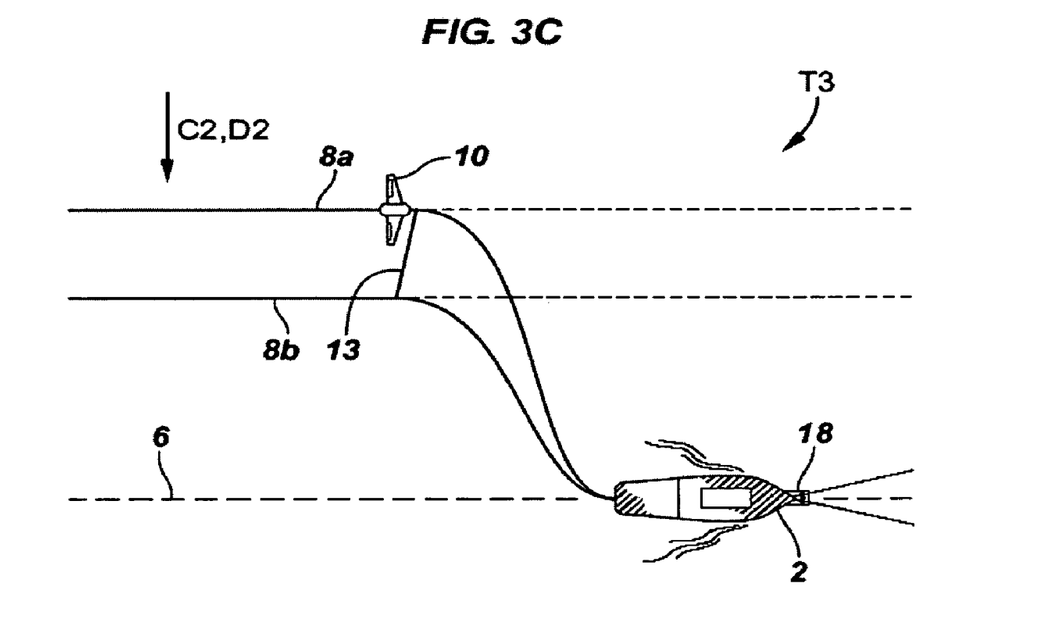

FIGS. 3A-3C illustrate schematically a time-lapse plan view, not to scale, illustrating features of certain inventive methods and apparatus. These figures illustrates a vessel, 2, moving from left to right in each figure along a pre-selected path 6, and two streamers 8a and 8b. Vessel 2 may include a current meter 18 attached near the bow of vessel 2, and may measure current ahead of vessel 2, although other embodiments are possible, as illustrated in FIG. 1. Streamer 8a is forced left by a deflector 10, and this serves to pull streamer 8b left as well, using a separation rope 13. Dotted lines above path line 6 indicate the preferred paths of streamers 8a and 8b, it being understood that there is normally an acceptable range of several meters for each. These acceptable ranges are not shown for clarity.

FIG. 3A illustrates the position of streamers 8a and 8b at a hypothetical time T1, influenced by a current C1 (indicated by the arrow) at a depth D1, and shows the streamers are not at their preferred positions. FIG. 3B illustrates that current meter 18 has detected a current C2 at a depth D2 that is substantially the same in magnitude, but in substantially opposite direction as current C1. Spread control elements, such as steerable birds, are commanded by a controller to move streamers 8a and 8b to depth D2, and it may be seen that at some time T2 a lead portion of each streamer has now been forced back to an acceptable position (lateral position and depth). However, as the main portion of each streamer remains under the influence of current C1 at depth D1, most of the streamers have yet to be guided back to an acceptable path. FIG. 3C represents the situation at a time T3 when all or substantially all of the length of each streamer is under the influence of current C2 at depth D2, and streamers 8a and 8b are tracking along an acceptable path and depth.

Figure 4:
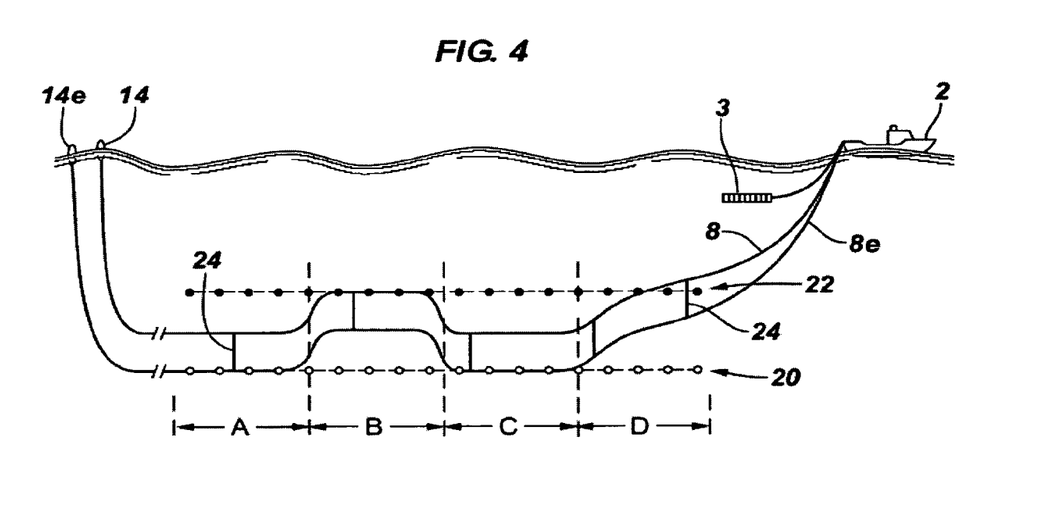
FIG. 4 illustrates another embodiment of the inventive methods and apparatus, using over/under configuration of streamers.

FIG. 4 illustrates another embodiment of the inventive methods and apparatus, using an over/under configuration of streamers. Over/under configuration towing may improve the seismic image considerably as one may be able to separate the downward propagating acoustic wave field from the upward propagating wave field. Among geophysicists this is called deghosting. Cross-line data interpolation, and prediction of the seismic wavefield away from a streamer in a horizontal plane including the streamer, may also be performed. By towing two or more sets of over/under configured streamers, for example towing two or more sets of streamers, each set in over/under configuration with lateral spacing there between, it is possible to form an array so as to cover a rectangle. FIG. 4 illustrates one towing arrangement employing systems and methods of the invention. Many variations are possible, and it should be emphasized again that the systems and methods of the invention are not limited to the specific embodiments illustrated and discussed herein. A seismic vessel 2 is illustrated towing an acoustic source 3 and a pair of streamers 8 and 8e, each of which may have an array of seismic sensors selected from hydrophones, geophones, noise sensors, and combinations thereof, and perhaps one or more current meters (not shown) hidden within streamers 8, 8e. The number of streamer pairs may exceed ten, but four to eight will probably be common. Each streamer pair comprises one streamer 8 placed as accurate as possible on top of the other streamer 8e in over/under configuration the entire length of each streamer, except for portions near terminal buoys 14 and 14e. In certain embodiments, top streamers 8 may be shorter than bottom streamers 8e. Seismic source 3 provides a pressure pulse that is reflected in the sub surface layers of the sea bottom and recorded by the seismic hydrophones. This signal is used to map the geological structure beneath the sea floor.

Referring again to FIG. 4, the vertical distance between streamers 8, 8e in a streamer pair may range from 1 meter to 50 meters, and may be about 5 meters. This separation may be maintained either with rigid or semi-rigid connectors 24, as indicated in FIG. 4, or without connectors, using steerable birds. Also illustrated are two depths, indicated by dotted lines 20 and 22, where the current is in substantially opposite directions and magnitudes. As discussed in reference to FIG. 2 previously, forces on streamer pair 8, 8e in FIG. 4 may be balanced by moving sections of the streamer pair to depths where the current is substantially opposed in direction and magnitude. For example, in FIG. 4, the line of circles 20 may represent current at that depth that is substantially opposite in direction to the current at a depth represented by a line of solid dots 22. Assuming the magnitudes of the currents is substantially equal but opposite in cross-line direction at the different depths, it is possible to maneuver streamer pair 8, 8e, so that portions A and C are at one depth, and other portions B and D are at the other depth. In this way, cross-line forces on the streamer may be balanced, as well as affording the opportunity to retrieve seismic data in a less noisy environment. Once the depth of the different sections is realized, steerable birds and other spread control elements may not be required, or their required steering lessened. It will be recognized that the current at one depth may not be exactly balanced in magnitude, or even in opposite direction, but the point is to substantially balance the forces on the streamers so that they may acquire data in less noisy conditions.

A selected number of hydrophones, either mounted within the streamer or in/on equipment mounted onto the streamer, may be used as receivers in an acoustic ranging system and thereby provide knowledge of the horizontal and vertical position of streamers. When discussing streamers in over/under configuration, such as in FIG. 4, the horizontal separation between adjacent pairs may range from near 0 to about 200 meters, however, as the horizontal separation approaches zero, relative cost and risk of loss and/or entanglement of streamers become greater.

Horizontal and vertical control of streamers 8 and 8e may be provided by spread control elements (not illustrated) which may be of any type as explained herein, such as small hydrofoils or birds that can provide forces in the vertical and horizontal planes. Spread control elements may be equally spaced along the length of the streamers. Spread control elements may be clamped to streamers, hung from streamers, or inserted inline in streamers to provide the desired vertical and horizontal position control. One type of spread control element useful in the invention is described in commonly assigned U.S. Pat. No. 6,671,223, describing a steerable bird known under the trade designation "Q-FIN", available from WesternGeco LLC, Houston, Tex., that is designed to be electrically and mechanically connected in series with a streamer. Other birds useful in the invention include battery-powered birds suspended beneath the lower streamer of a streamer pair and including a pair of laterally projecting wings, the combination of streamers, spread control elements (birds) being arranged to be neutrally buoyant. Clamp-on birds, as discussed previously, may also be employed. Birds useful in the invention, including suspended birds, in-line birds, and clamp-on birds may include on-board controllers and/or communications devices, which may be microprocessor-based, to receive control signals representative of desired depth, actual depth, desired lateral position, actual lateral position and roll angle of the bird. The bird on-board controllers may communicate with local controllers mounted on or in other birds, and/or communicate with other local controllers and/or remote controllers, such as a supervisory controller.

As mentioned hereinbefore, streamers useful in the invention may include hydrophones, geophones, and other sensors, such as noise sensors distributed along their length; they also may include control and conversion circuitry for converting the outputs of the hydrophones and geophones into digital data signals, longitudinally extending control and data lines for conducting control and data signals to and from the control and conversion circuitry, and electrical power supply lines for supplying electrical power from the vessel to the circuitry. All these lines may be coupled together from one streamer section to another streamer section via respective corresponding lines which extend through bodies of steerable birds, through adjacent streamer sections, and through its nearest neighboring steerable bird, and so on down the length of the streamer. Alternatively or additionally, wireless and optical transmission signals may be generated and received by functional components in or on the streamers and steerable birds.

Spread control elements useful in the invention may connect to at least one streamer in such a way that it is able to communicate with the outside world, which may be a vessel, satellite, or land-based device. The way this may be accomplished varies in accordance with the amount of energy the spread control elements require and the amount of energy they may be able to store locally in terms of batteries, fuel cells, and the like. If the local storage capacity for batteries, fuels cells, and the like is sufficient, spread control elements may be clamped onto the streamer skin at locations where there is located an inductor inside the streamer skin. Then any particular spread control element and its streamer can communicate through the skin with electrical impulses. If, on the other hand, a spread control element needs charging power from the streamer a different approach is required. In this case the spread control element may be mounted between two streamer sections and as such comprise an insert between two streamer sections, as described herein.

It is within the invention to combine systems of the invention with other position control equipment, such as source array deflecting members, and streamer deflectors. Some of these may include bridle systems, pneumatic systems, hydraulic systems, and combinations thereof.

As mentioned herein, materials of construction of spread control elements and streamers useful in systems and methods of the invention may vary. However, there may be a need to balance the seismic equipment so that the system is balanced to be neutrally buoyant in the water or nearly so, to perform its intended function. Polymeric composites, with appropriate fillers used to adjust buoyancy and mechanical properties as desired, may be employed.

In use the position of a pair of streamers may be actively controlled by GPS or other position detector sensing the position of the streamer pair, and tilt sensors, acoustic sensors, or other means may sense the orientation of one or more individual streamers and feed this data to navigation and control systems. The positions of GPS nodes could be measured while the streamer shape may be calculated using a simulation and optionally current direction and magnitude measurements. Or all streamer positions could be determined by simulation only. Alternatively, data may be fed-forward to local controllers on one, some, or all spread control elements. Gross positioning and local movement of the streamer pair may be controlled on board a tow vessel, on some other vessel, locally, or indeed a remote location. By using a communication system, either hardwire or wireless, information from the remote controller may be sent to one or more local controllers on spread control elements, and, when present and when desired, one or more deflecting members or streamer deflectors. The local controllers in turn are operatively connected to adjustment mechanisms comprising motors or other motive power means, and actuators and couplers connected to the spread control elements, and, if present, deflectors, which function to move the streamers as desired. This in turn adjusts the position of the streamer pair, causing it to move as desired. Feedback control may be achieved using local sensors positioned as appropriate depending on the specific embodiment used, which may inform the local and remote controllers of the position of one or more spread control elements, the tilt angle of a pair of streamers, distance between streamer pairs, a position of an actuator, the status of a motor or hydraulic cylinder, the status of a bird, and the like. A computer or human operator can thus access information and control the entire positioning effort, and thus obtain much better control over the seismic data acquisition process.

Methods and apparatus of the invention may also be useful in deployment of so-called ocean bottom cables. Ocean bottom cables are typically deployed from one or more vessels, and care is taken to ensure that the cable is placed in the desired position. Ocean currents, particularly those at different depths, will influence movement of the cables as they are being deployed from the vessel onto the sea floor. The portion of the cable that is traversing through the ocean may benefit by, for example, being deployed through a deployment zone where substantially equal magnitude and opposite direction currents exist, thereby balancing the overall forces on the cable.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, no clauses are intended to be in the means-plus-function format allowed by 35 U.S.C. § 112, paragraph 6 unless "means for" is explicitly recited together with an associated function. "Means for" clauses are intended to cover the structures described herein as performing the recited function and not only structural equivalents, but also equivalent structures.

What is claimed is:

1. A method for adjusting one or more streamers during seismic data acquisition, comprising:
    providing an acceptable path for each streamer;
    sensing a first cross current pushing against a first section of a streamer in a first direction substantially perpendicular to the first streamer;
    sensing a second cross current pushing against a second section of a streamer in a second direction opposite the first direction;
    determining whether the second cross current is sufficient to keep the streamer within the acceptable path; and
    allowing the first section to drift toward the second direction if it is determined that the second cross current is sufficient to keep the streamer within the acceptable path.

2. The method of claim 1, wherein one or more steerable birds are disposed on the streamer and the method further comprising:
    moving the first section of the streamer toward the second direction using the steerable birds if it is determined that the second cross current is sufficient to keep the streamer within the acceptable path.

3. The method of claim 1, wherein the first section is a first depth and the second section is at a second depth different from the first depth.

4. The method of claim 1, wherein the first cross current is sensed by a first current meter disposed on the first section.

5. The method of claim 1, wherein the second cross current is sensed by a second current meter disposed on the second section.

6. The method of claim 1, further comprising determining whether the streamer is within the acceptable path.

7. The method of claim 1, wherein the acceptable path comprises a range for the streamer to move laterally.

8. The method of claim 1, wherein the acceptable path comprises a left most edge and a right most edge.

9. A method for adjusting one or more streamers during seismic data acquisition, comprising:
    disposing a first section and a second section of a streamer at a first depth, where a first cross current is acting upon the first section and the second section in a first direction substantially perpendicular to the streamer;
    disposing a third section and a fourth section of the streamer at a second depth different from the first depth where second cross current is acting upon the third section and the fourth section in a second direction opposite the first direction; and
    wherein the magnitude of the first cross current and the magnitude of the second cross current are substantially equal.

10. The method of claim 9, wherein the second section is disposed between the third section and the fourth section.

11. The method of claim 9, wherein the third section is disposed between the first section and the second section.

12. The method of claim 9, wherein the first section is positioned at a distal end of the streamer.

13. The method of claim 9, wherein the fourth section is positioned at a proximate end of the streamer.

14. The method of claim 9, wherein the first depth is deeper than the second depth.

15. The method of claim 9, wherein the streamer is an over/under streamer pair.

* * * * *